United States Patent Office 3,502,707
Patented Mar. 24, 1970

3,502,707
β-(CYCLOHEXYL AND SUBSTITUTED PHENYL)-α-(4,5-DIMETHOXY-2-NITRO- OR AMINOPHENYL) ACRYLONITRILES
John T. Suh, Mequon, Wis., assignor to McNeil Laboratories, Incorporated, a corporation of Pennsylvania
No Drawing. Continuation-in-part of application Ser. No. 401,635, Oct. 5, 1964. This application Sept. 11, 1967, Ser. No. 666,921
Int. Cl. C07c 121/66
U.S. Cl. 260—465      7 Claims

ABSTRACT OF THE DISCLOSURE

The compounds are of the type of β-(cyclohexyl and substituted phenyl)-α-(dimethoxy-2-nitrophenyl) acrylonitriles, and 2-aminophenyl derivatives thereof. The compounds are useful as ultraviolet absorbers.

---

This application is a continuation-in-part of my copending application, Ser. No. 401,635, filed Oct. 5, 1964, now U.S. Patent No. 3,381,006.

This invention relates to a new series of compounds. More particularly, it concerns certain β-substituted-α-(4,5-dimethoxy-2-nitrophenyl)acrylonitriles and certain β-substituted - α - (4,5 - dimethoxy - 2 - aminophenyl)acrylonitriles which may be represented as follows:

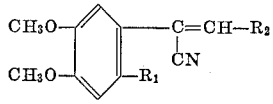

In the above formula $R_1$ stands for nitro or amino; and $R_2$ stands for halophenyl, cyanophenyl, halomethylphenyl, lowerdialkylaminoloweralkyloxyphenyl and cyclohexyl.

Compounds of the structure represented by the formula wherein $R_1$ is nitro are prepared by condensing 4,5-dimethoxy-2-nitrophenyl acetonitrile with an aldehyde selected from the group consisting of halophenyl, cyclohexyl, cyanophenyl, trihalomethylphenyl, and lowerdialkylaminoloweralkyloxyphenyl aldehydes in the presence of a catalytic amount of piperidine.

As used herein, loweralkyl may be straight or branch chained and have from 1 to 4 carbon atoms, such as, for example, methyl, ethyl, propyl, isopropyl, butyl, isobutyl, tertiary butyl and the like.

The compounds of this invention absorb ultraviolet light and are useful as sun-screening materials in salves and ointments. In addition, because of their solubility in organic materials generally, they may be used as ultraviolet absorbers in plastics and resins, such as polystyrene, polyethylene, polypropylene, polyacrylics (methacrylate resins, polyacylamides, polyacrylonitrile fibers), polyamide fibers (nylon e.g.) and polyester fibers. In the latter use, the inclusion of 0.01 to 5 percent of the absorber, based on the polymer weight, is sufficient to render protection against ultraviolet light, such as in plastic film or light filters. The absorber may be incorporated in the mixtures of monomers before polymerization to form the polymer or it may be incorporated in the polymer at any stage during its handling, as by milling into the polymer together with other compounding ingredients or during the spinning of polymers into fibers, etc.

The novel compounds of this invention are also useful as intermediates in the preparation of novel indoles by reductive cyclization. The reductive cyclization of the 3-substituted-4,5-dimethoxy-2-nitrophenyl acrylonitriles is desirably achieved by adding iron powder to a refluxing solution of the nitrile in a glacial acetic acid and allowing the reaction mixture to reflux for 2 to 5 hours. The solvent is distilled under diminished pressure and the crude product is purified by recrystallization. The elemental analyses as well as ultraviolet absorption, infrared absorption and nuclear magnetic resonance spectra support the assignment of the indole structures described herein.

The following examples are intended to illustrate, but not to limit, the scope of the invention.

EXAMPLE I

To a refluxing solution of 30 grams of 4,5-dimethoxy-2-nitrophenylacetonitrile in 250 ml. of absolute methanol is added 33 grams of p-2-diethylaminoethoxybenzaldehyde and 10 ml. of piperidine. The resulting mixture is refluxed for 6 hours, cooled, filtered to yield a solid which is recrystallized from methanol to obtain β-[p-(2-diethylaminoethoxy)phenyl] - α - (4,5 - dimethoxy - 2 - nitrophenyl)acrylonitrile. Melting point: 105° C.

EXAMPLE II

To a refluxing solution of 20.5 grams of β-[p-(2-diethylaminoethoxy)phenyl] - α - (4,5 - dimethoxy - 2 - nitrophenyl)acrylonitrile in 200 ml. of acetic acid is added in portions, 5.6 grams of iron powder. The reaction mixture is refluxed for 4 hours. The mixture is filtered and the filtrate is distilled in vacuo. The residue is treated with 20.0 ml. of water and 30 percent of sodium hydroxide to make the solution basic and filtered. The product obtained is 3-cyano-2-[p-(2-diethylaminoethoxy)phenyl]-5,6-dimethoxyindole which is recrystallized several times from dilute methanol. Melting point: 165° C.

EXAMPLE III

To a refluxing solution of 10 grams of 4,5-dimethoxy-2-nitrophenylacetonitrile in 200 ml. of methanol is added in portions of 7 grams of cyclohexanecarboxyaldehyde and 3 ml. of piperidine. The mixture is allowed to reflux for 6 hours. The reaction mixture is cooled and the solid product precipitated is filtered and crystallized from methanol to give β-cyclohexyl-α-(4,5-dimethoxy-2-nitrophenyl)acrylonitrile. Melting point: 161° C. Ultraviolet absorption in methanol: 248 mμ (ε 12,400); 295, 342 mμ.

EXAMPLE IV

To a refluxing solution of 22.5 grams of β-cyclohexyl-α-(4,5-dimethoxy-2-nitrophenyl)acrylonitrile in 200 ml. of acetic acid is added in portions 8.4 grams of iron powder. The resulting mixture is refluxed for 6 hours. The reaction mixture is filtered and the filtrate is evaporated under diminished pressure to give a residue which is recrystallized from ethyl acetate-hexane to obtain 3-cyano-2-cyclohexyl-5,6-dimethoxyindole. Melting point: 137–139° C.

EXAMPLE V

To a warm solution of 30 grams of 4,5-dimethoxy-2-nitrophenylacetonitrile in 300 ml. of absolute ethanol, 20 grams of 4-cyanobenzaldehyde and 9.45 ml. of piperidine are added. The reaction mixture is refluxed for 3 hours. The resulting mixture is filtered to yield a bright yellow product which is crystallized from methanol to give α-(2-nitro-4,5-dimethoxyphenyl) - β - (4 - cyanophenyl) acrylonitrile. Melting point: 214–215° C. Ultraviolet absorption in methanol: 246 mμ (ε 14,200); 289 mμ (ε 26,600).

EXAMPLE VI

A solution of 5 grams of α-(2-nitro-4,5-dimethoxyphenyl)-β-(4-cyanophenyl)acrylonitrile in 175 ml. of acetic acid is stirred with 1.66 grams of iron powder under refluxing conditions for approximately 2 hours. The reaction mixture is cooled and filtered. The solid product is recrystallized from methanol to yield 3-cyano-5,6-dimethoxy-2-(4-cyanophenyl)indole. Melting point: 283° C. Ultraviolet absorption in methanol: 219 mμ (ε 28,000); 242 mμ (ε 16,300); 359 mμ (19,900).

EXAMPLE VII

To a refluxing solution of 21 grams of 4,5-dimethoxy-2-nitrophenylacetonitrile in 200 ml. of methanol is added in portions, 14 grams of p-chlorobenzaldehyde in 100 ml. of methanol and 5 ml. of piperidine. The mixture is refluxed for 4 hours. The reaction mixture is cooled and the solid product is filtered and recrystallized from methanol to give β-(p-chlorophenyl)-α-(4,5-dimethoxy-2-nitrophenyl)acrylonitrile. Melting point: 176.5–177° C. Ultraviolet absorption in methanol: 295 mμ (ε 25,800); 223 mμ (ε 18,700).

EXAMPLE VIII

To a refluxing solution of 24 grams of β-(p-chlorophenyl)-α-(4,5-dimethoxy-2 - nitrophenyl)acrylonitrile in 200 ml. of glacial acetic acid is added in portions 8 grams of iron powder. The reaction mixture is refluxed for 3 to 4 hours, cooled and then filtered. The residue is washed with hot methanol and boiling water and crystallized from methanol to give 3-cyano-2-(p-chlorophenyl)-5,6-dimethoxyindole. Melting point: 284–285° C. Ultraviolet absorption in methanol: 331 mμ (ε 22,000); 236 mμ (ε 24,800).

EXAMPLE IX

A mixture of 10 grams of β-(p-chlorophenyl)-α-(4,5-dimethoxy-2-nitrophenyl)acrylonitrile and 1 gram of palladium-on-carbon in 175 ml. of 1,2-dimethoxyethane is shaken with hydrogen at room temperature. The theoretical amount of hydrogen is taken up within 2 hours. The reaction mixture is filtered. The filtrate is evaporated in vacuo and the residue is triturated with petroleum ether and ethanol. A bright orange product, α-(2-amino-4,5-dimethoxyphenyl)-β-(p-chlorophenyl)acrylonitrile is obtained which is crystallized from benzene. Melting point: 112–115° C.

EXAMPLE X

Using the procedure of Example VII and replacing the p-chlorobenzaldehyde with an equivalent amount of p-trifluoromethylbenzaldehyde, the product recovered is β-(p-trifluoromethylphenyl)-α - (4,5 - dimethoxy - 2-nitrophenyl)acrylonitrile.

EXAMPLE XI

Using the procedure of Example IX and replacing β-(p-chlorophenyl)-α-(4,5 - dimethoxy - 2-nitrophenyl)acrylonitrile with the β-derivatives of Examples I, III, V and X, the corresponding β-substituted-α-(4,5 - dimethoxy - 2-phenyl)acrylonitriles are obtained, for example: β-[p-(2-diethylaminoethoxy)phenyl]-α - (4,5-dimethoxy-2-aminophenyl)acrylonitrile, β-cyclohexyl-α-(4,5 - dimethoxy - 2-aminophenyl)acrylonitrile, α-(2-amino - 4,5 - dimethoxyphenyl)-β-(4 - cyanophenyl)acrylonitrile, and β-(p-trifluoromethylphenyl)α - (4,5 - dimethoxy-2-aminophenyl)acrylonitrile.

EXAMPLE XII

Using the procedure of Example VIII and replacing the β-(p-chlorophenyl)-α - (4,5 - dimethoxy-2-nitrophenyl)-acrylonitrile with an equivalent amount of β-(p-trifluoromethylphenyl)-α - (4,5 - dimethoxy-2-nitrophenyl)acrylonitrile, the product recovered is 3-cyano-2-(p-trifluoromethylphenyl)-5,6-dimethoxyindole.

What is claimed is:

1. A member of the group consisting of β-substituted-α-(4,5-dimethoxy-2 - nitrophenyl)acrylonitriles and β-substituted-α-(4,5-dimethoxy - 2 - aminophenyl)acrylonitriles having the formula

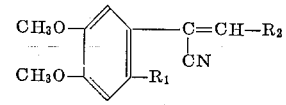

wherein $R_1$ is a member of the group consisting of nitro and amino, and $R_2$ is a member of the group consisting of cyclohexyl, chlorophenyl, cyanophenyl, trifluoromethylphenyl, and lowerdialkylamino-loweralkyloxyphenyl.

2. α-(4,5 - dimethoxy - 2-nitrophenyl)-β-[p-(2-diethylaminoethoxy)phenyl]acrylonitrile.

3. α-(4,5-dimethoxy - 2 - nitrophenyl)-β-(cyclohexyl) acrylonitrile.

4. α-(4,5-dimethoxy - 2-nitrophenyl)-β-(4-cyanophenyl) acrylonitrile.

5. α-(4,5-dimethoxy - 2 - nitrophenyl)-β-(p-chlorophenyl) acrylonitrile.

6. α-(4,5-dimethoxy - 2 - aminophenyl)-β-(p-chlorophenyl) acrylonitrile.

7. α-(4,5-dimethoxy - 2 - nitrophenyl)-β-(p-trifluoromethylphenyl)acrylonitrile.

References Cited

UNITED STATES PATENTS

| | | | |
|---|---|---|---|
| 3,370,063 | 2/1968 | Suh | 260—465 X |
| 3,381,006 | 4/1968 | Suh. | |
| 3,408,396 | 10/1968 | Suh | 260—465 X |
| 3,415,866 | 12/1968 | Suh | 260—465 |

OTHER REFERENCES

Walker, Journal of the American Chemical Society, vol. 78, pp. 3698–3701 (1956).

CHARLES B. PARKER, Primary Examiner

S. T. LAWRENCE III, Assistant Examiner

U.S. Cl. X.R.

252—300; 260—45.9, 326.15, 326.16; 424—59, 174